(12) United States Patent
Ejerhed

(10) Patent No.: US 7,058,564 B2
(45) Date of Patent: Jun. 6, 2006

(54) METHOD OF FINDING ANSWERS TO QUESTIONS

(75) Inventor: Eva Ingegerd Ejerhed, Stockholm (SE)

(73) Assignee: Hapax Limited, London (GB)

( * ) Notice: Subject to any disclaimer, the term of this patent is extended or adjusted under 35 U.S.C. 154(b) by 51 days.

(21) Appl. No.: 09/824,064

(22) Filed: Apr. 3, 2001

(65) Prior Publication Data

US 2002/0177991 A1   Nov. 28, 2002

(30) Foreign Application Priority Data

Mar. 30, 2001   (SE) ................................ 0101127

(51) Int. Cl.
    *G06F 17/30* (2006.01)
    *G06F 17/27* (2006.01)
    *G06F 7/02* (2006.01)

(52) U.S. Cl. .................................. 704/1; 704/9; 707/3

(58) Field of Classification Search ................. 707/5, 707/4, 3, 102; 704/9, 8, 257, 2, 1; 434/362
See application file for complete search history.

(56) References Cited

U.S. PATENT DOCUMENTS

| | | | |
|---|---|---|---|
| 5,386,556 A * | 1/1995 | Hedin et al. ............. | 707/4 |
| 5,519,608 A | 5/1996 | Kupiec | |
| 5,696,962 A | 12/1997 | Kupiec | |
| 5,884,302 A | 3/1999 | Ho | |
| 5,895,466 A | 4/1999 | Goldberg et al. | |
| 5,933,822 A | 8/1999 | Braden-Harder | |
| 6,202,064 B1 * | 3/2001 | Julliard .................... | 707/5 |

FOREIGN PATENT DOCUMENTS

WO    WO 98/25217 A1    6/1998

OTHER PUBLICATIONS

Aliod et al., "A Real World Implementation of Answer Extraction," in Proceedings of the 9th International Workshop on Database and Expert Systems, Workshop (NLIS-98), 1998.*
Voorhes "Using WordNet for Text Retrieval," in WordNet: An Electronic Lexical Database, edited by Christiane Fellbaum, MIT Press 1998.*
Hirshman, et al. "Deep Read: A Reading Comprehension System" In Proceedings of the 37th annual meeting of the Association for Computational Linguistics, 1999.*

(Continued)

*Primary Examiner*—V. Paul Harper
(74) *Attorney, Agent, or Firm*—Buchanan Ingersoll PC

(57) ABSTRACT

A method and a system for automatically finding one or more answers to a natural language question in a computer stored natural language text database is disclosed. The natural language text database has been analyzed with respect to syntactic functions of constituents, lexical meaning of word tokens and clause boundaries, and the natural language question comprises a question clause. A computer readable representation of the question clause is analyzed with respect to syntactic functions of its constituents and the lexical meaning of its word tokens. In response to the analysis a set of conditions for a clause in the natural language text database to constitute an answer to the question clause is defined. The conditions relate to the syntactic functions of constituents and the lexical meaning of word tokens in the clause. Furthermore, clauses that satisfy said conditions are identified in the natural language text database, and answers to the question clause is returned by means of the identified clauses that matches the conditions.

5 Claims, 3 Drawing Sheets

OTHER PUBLICATIONS

Magerman, David "Statistical Decision-Tree Models for Parsing," Proceedings of the 33rd Meeting of the Association for Computational Linguistics, 1995.*

Riloff et al., "A Rule-Based Question Answering System for Reading Comprehension Tests," ANLP/NAACL-2000 Workshop on Reading Comprehension Tests as Evaluation for Computer-Based Language Understanding Systems, May 4, 2000.*

Wang et al., "A Question Answering System Developed as a Project in a Natural Language Processing Course," IN ANLP/NAACL Workshop on Reading comprehension Tests as Evaluation for Computer-Based Language Understanding Systems, May 4, 2000.*

"Information Extraction Supported Question Answering" Rohini Srihari and Wei Li, Oct. 15, 1999.

* cited by examiner

<cl1>*The US* is expelling 50 Russian diplomats, including four said to have "run" Robert Hanssen, the FBI agent accused last month of spying for Russia</cl1>.

Fig. 3A

<cl1> *Russia* is expelling a matching number of US diplomats </cl1>.

Fig. 3B

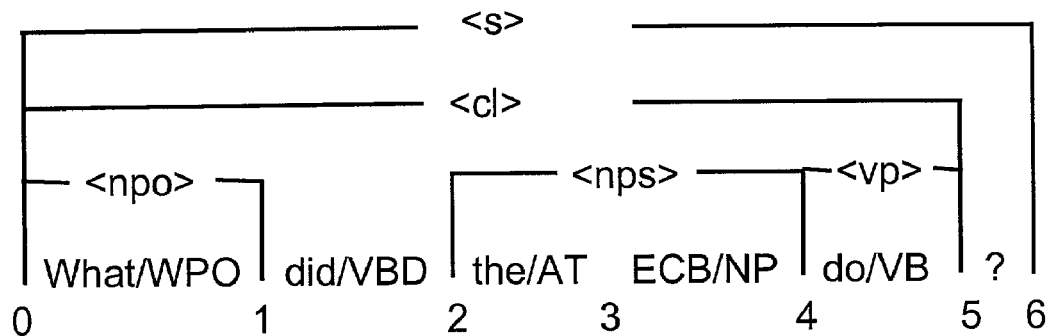

Fig. 4

<cl1> The ECB *has made mistakes*, </cl1> <cl2> and has been frequently criticized for them</cl2>.

Fig. 5A

<cl1> The euro-zone inflation rate will soon fall below the tolerance level of 2 per cent </cl1> <cl2> that the ECB *imposed* </cl2>.

Fig. 5B

<cl1> The ECB *has never pursued a pure policy of minimising the rate of inflation,* </cl1> <cl2> but has taken *a* much more practical approach of maximising the rate of growth, given an acceptable rate of price increases </cl2>.

Fig. 5C

<cl1>The ECB *has performed almost spectacularly well*, much better certainly than the Bundesbank in its dying years, and better even than the Federal Reserve during the recent boom and bust </cl1>.

Fig. 5D

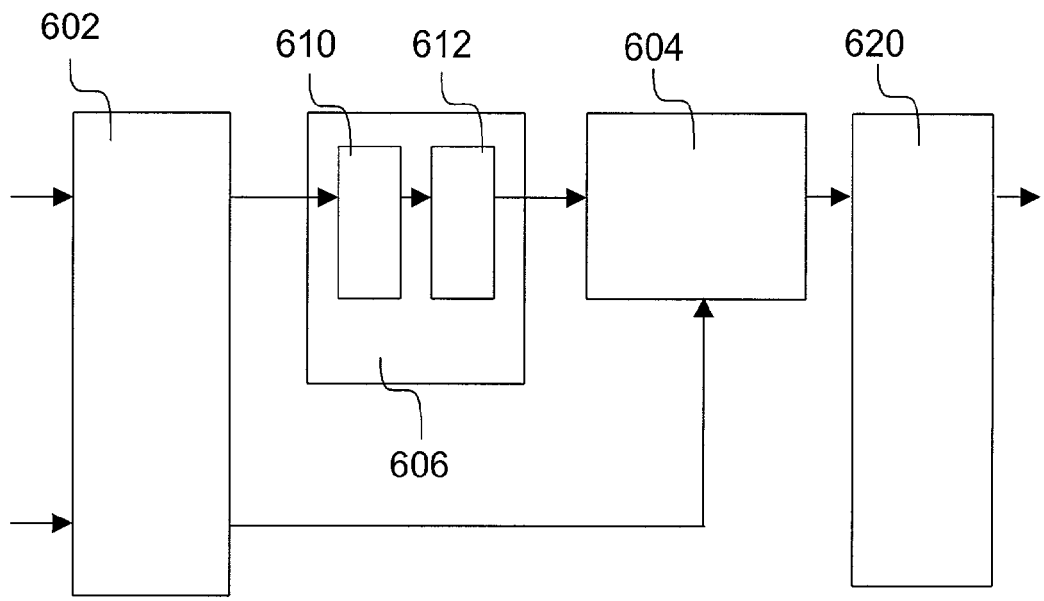

Fig. 6

METHOD OF FINDING ANSWERS TO QUESTIONS

FIELD OF THE INVENTION

The present invention relates to the field of information retrieval from unrestricted text in different languages. More specifically, the present invention relates to a method, and a corresponding system, for automatically finding answers to a natural language question in a natural language text database.

BACKGROUND OF THE INVENTION

The field of automatic retrieval of information from a natural language text database has in the past been focused on the retrieval of documents matching one or more key words given in a user query. As an example, most conventional search engines on the Internet use Boolean search to match key words given by the user. Such key words are standardly considered to be indicative of topics and the task of standard information retrieval system has been seen as matching a user topic with document topics. Due to the immense size of the text database to be searched in information retrieval systems today, such as the entire text database available on the Internet, this type of search for information has become a very blunt tool for information retrieval. A search most likely results in an unwieldy number of documents. Thus, it takes a lot of effort from the user to find the most relevant documents among the documents retrieved, and then to find the desired information in the relevant documents. Furthermore, due to the ambiguity of words and the way they are used in a text, many of the documents retrieved are irrelevant. This makes it even more difficult for the user to find the information needed.

The performance of an information retrieval system is usually measured in terms of its recall and its precision. In information retrieval, the technical term recall has a standard definition as the ratio of the number of relevant documents retrieved for a given query over the total number of relevant documents for that query. Thus, recall measures the exhaustiveness of the search results. Furthermore, in information retrieval, the technical term precision has a standard definition as the ratio of the number of relevant documents retrieved for a given query over the total number of documents retrieved. Thus, precision measures the quality of the search results. Due to the many documents retrieved when using the above type of search methods, it has been realized within the art that there is a need to reduce the number of retrieved documents to the most relevant ones. In other words, as the number of documents in the text database increases, recall becomes less important and precision becomes more important. Therefore, suppliers of systems for information retrieval have enhanced Boolean search by using among other things relevance ranking based on statistical methods. However, it is well known that thus highly ranked documents still comprise irrelevant documents.

Questions are a specific type of query. In the field of computerized question answering, systems range from delivering answers to simple questions to presenting complex results compiled from different sources of information. How well a question is answered is typically judged by human standards. Differently expressed, how would a well informed human being respond to a question with respect to correctness and exhaustiveness of the answer (if there is more than one answer), with respect to the succinctness of the answer to the question posed, and with respect to delivering answers quickly.

A basic difficulty for question answering systems is that, as opposed to general information retrieval systems, the inquired fact is often very specific. Thus, the need for precision becomes even more acute.

Many prior art question answering systems suffer from being dependent on knowledge specific to a domain, to a line of business or a special trade. World knowledge optimal for one domain is of little value to another and thus hard to port. To update world knowledge for a domain specific question answering system automatically is not technically feasible and such systems do not scale well.

Other prior art question answering systems that are independent of genre or domain are often restricted with regard to the type of question a user can ask, for example closed-class questions. They are direct questions whose answers are all assumed to lie in a set of objects, and are expressible as noun phrases.

SUMMARY OF THE INVENTION

An object of the present invention is to provide an improved method, and a corresponding system, for automatically finding answers to a natural language question by means of a computer stored natural language text database, that are not subject to the foregoing disadvantages of existing methods for this task, i.e. that are not domain specific and that deliver answers to questions with high precision. This object is achieved by a method and a system according to the accompanying claims.

The present invention is based on the insight that the relationship between the constituents and their respective syntactic functions in a question clause within a natural language question and the constituents and their respective syntactic functions in a clause that constitutes an answer to the natural language question can be used successfully in order to find answers to a natural language question in a natural language text database.

The term constituents refers to the basic units of text, such as word tokens, phrases etc. An important property of these units is that they can be found using finite state methods that recognize a strict hierarchy of constituents. Using finite state methods for syntactic analysis is well known within the art. However, the finite state method referred to here is a method of finding so-called initial clauses. Such a method is described in further detailed in the Swedish patent application SE 0002034-7 and U.S. patent application Ser. No. 09/584,135. Initial clauses have the property of being non-recursive, i.e. no initial clause includes another initial clause. Whenever the term clause is used in the following, it should be interpreted as initial clause.

Thus, according to a first aspect of the invention, a method is provided for automatically finding an answer to a natural language question in a computer stored natural language text database. The natural language text database has been analyzed with respect to syntactic functions of constituents, lexical meaning of word tokens, and clause boundaries, i.e. these are known to the system performing the method. The natural language question comprises a question clause, which is the clause that conveys the content of the information need. The method comprises an analysis step, where a computer readable representation of said question clause is analyzed with respect to the syntactic functions of its constituents and the lexical meaning of its word tokens. In response to the analysis step, a set of conditions for a clause in the natural language text database to constitute an answer to the question clause is defined. The conditions relate to the syntactic functions of constituents and the lexical meaning of word tokens in the clause. Clauses that satisfy the conditions are identified in the natural language text database, and one or more answers to the question clause are returned by means of the identified clauses that satisfy said conditions.

The conditions that are defined according to the invention are based on the relationship between the constituents and their respective syntactic functions in a question clause and the constituents and their respective syntactic functions in a clause that answers the question clause. More specifically, one or more of the constituents in the question clause, or constituents that are equivalent in terms of lexical meaning, occur in a clause that answers the question, and the syntactic functions in the clause that answers the question of each of the constituents, or constituents that are equivalent in terms of lexical meaning, can be determined from the syntactic functions of the constituents of the question clause. By defining the conditions based on such relationships and then identifying clauses in the natural language text database that satisfy the conditions, an answer to a natural language question can be found without the need to rely on domain specific world knowledge. Thus, an advantage of a method of the invention is that it can be performed without the need of a large database with world knowledge which will decrease the amount of data to store. Moreover, the precision of such a method is high.

Furthermore, the use of relations for several different type of constituents, rather than limiting the answers to a closed type and the like, also permits several answers to one question, and answers that do not necessarily identify objects by name but that still convey significant information to a user. In other words the invention identifies a limitation in prior art, where question answering systems have been considered to relate only to the answering of questions that have unique answers. In most cases this is not the case and such prior art methods thus have a limited applicability for a large set of questions (user information needs). In particular, the proposed method enables the finding of relations between persons or objects.

The term lexical meaning should be interpreted broadly. For example, in addition to word tokens that have the same lemma and word tokens that are synonyms, it is in some cases fruitful to consider word tokens that belong to the same broad semantic class to be considered as having equivalent lexical meanings. For example names, definite descriptions and personal pronouns may be interpreted as having an equivalent lexical meaning, such as the name Jim Jarmusch, the definite description the director of Down by law, and the personal pronoun he.

One condition in the set of matching conditions is preferably a condition relating to a lexically headed constituent having the syntactic function of main verb in the question clause. This condition stipulates that the lexically headed constituent having the syntactic function of main verb in the question clause has to have a corresponding constituent in a matching clause, i.e. a lexically headed constituent having the syntactic function of main verb and having an equivalent lexical meaning, in order for that clause to constitute an answer to the question clause. This condition introduces the use of a condition that relates to a verb in the questions clause, which in prior art has not been considered to convey any significant information regarding the queried information.

Another condition in the set of conditions is preferably a condition relating to a lexically headed constituent having the syntactic function of subject in the question clause. This condition stipulates that the lexically headed constituent having the syntactic function of subject in the question clause has to have a corresponding constituent in a clause, i.e. a lexically headed constituent having the syntactic function of subject and having an equivalent lexical meaning, in order for that clause to constitute an answer to the question clause.

Yet another condition in the set of conditions is preferably a condition relating to a lexically headed constituent having the syntactic function of object in the question clause. This condition stipulates that the constituent having the syntactic function of object in the question clause has to have a corresponding constituent in the clause, i.e. a constituent bearing the syntactic function of object and having an equivalent lexical meaning, in order for that clause to constitute an answer to the question clause.

Moreover, further conditions on other constituents in clauses may be added to the set of conditions in order to increase the precision further. Such conditions are for example conditions relating to constituents having the syntactic functions of manner adverb, place adverb, time adverb, and causal adverb, respectively, of the question clause, or conditions relating to constituents bearing any other syntactic function. Also these condition are preferably used in combination with one or more of the other conditions.

Other syntactic functions which could be used in stating conditions are for example head and modifier. Using such functions it is possible to find clausal answers that are expressed as noun phrases that are nominalizations of clauses. As an example the question What did the company use to solve the problem? can be answered by The company used a new method to solve the problem. but it can also be answered by the noun phrase the company's use of a new method to solve the problem . . . .

The conditions above may be used separately, but they are preferably combined in such a way that they jointly state necessary and sufficient conditions for a database clause to constitute an answer to a given question clause. This increases the precision of the method even further.

In addition to, or instead of, the conditions above relating to the syntactic functions of constituents, there can be conditions only on the co-occurrence of certain constituents in a clause. For example, a condition regarding the constituents in the question clause may be defined stipulating that the constituents of the question clause, or constituents that have equivalent lexical meanings, should occur in a clause of the natural language text database in order for that clause to constitute an answer to the question clause.

Furthermore, conditions referring to a sequence of two or more clauses in the natural language text database are also envisaged.

One embodiment of the invention is directed to constituent questions (wh-questions) comprising an interrogative pronoun, such as what, who, which etc. According to this embodiment, i.e. where there is an interrogative pronoun in the question clause, the syntactic function of the queried constituent of the question clause is determined not only in response to the analysis step, but also in response to the interrogative pronoun. By also taking an interrogative pronoun into consideration, conditions can be defined that increase the precision of the method even further. This is due to the fact that the interrogative pronoun itself carries information of respective semantic classes of constituents of a clause that answers the question clause. For some interrogative pronouns the syntactic function of the queried constituent is the same syntactic function as the interrogative pronoun has. For other interrogative pronouns the syntactic function of the queried constituent will be another syntactic function than the interrogative pronoun has, but it will be possible to determine the syntactic function of the queried constituent based on the identified interrogative pronoun and the analysis in the analysis step. Furthermore, the interrogative pronoun can also be used in order to determine the broad semantic class of the queried constituent. For example, the presence of the interrogative pronoun who in a natural language question indicates that the queried constituent is a noun phrase denoting a person.

Another embodiment concerns yes/no questions. These questions do not comprise any interrogative pronoun. Furthermore, each constituents of a question clause in a yes/no question has a corresponding constituent, i.e. a constituent that has the same lexical meaning and the same syntactic function, in a clause that constitutes an answer to the question clause. The way that a yes/no question can be distinguished from a statement will differ depending on the language. For example in some language it can be determined from the word order.

In either of the embodiments above the answer to the question may be found in a clause that satisfies the conditions. Thus, by extracting portions of text comprising the clauses that satisfy the conditions and presenting them to a user, the answer to the question clause will be evident to the user. In the embodiment concerning yes/no questions, a yes or no answer can alternatively be derived automatically from the clauses that satisfy the conditions, and then presented to the user.

According to a second aspect of the invention, a system is provided for automatically finding an answer to a natural language question by means of a computer stored natural language text database. The system comprises storage means for storing the natural language text database. The natural language text database has been analyzed with respect to syntactic functions of constituents, lexical meaning of word tokens, and clause boundaries. The system also comprises analyzing means for analyzing a computer readable representation of a question clause of a natural language question with respect to syntactic functions of its constituents and lexical meaning of its word tokens, and defining means for defining, in response to an analysis performed by the analyzing means, a set of conditions for a clause in the natural language text database to constitute an answer to the question clause. The conditions relate to syntactic functions of constituents and lexical meaning of word tokens in the clause. The defining means are operatively connected to the analyzing means. Furthermore, the system comprises answer finding means for identifying in the natural language text database clause that satisfy the conditions and for returning an answer to the question clause by means of the clauses that satisfy the conditions. The answer finding means are operatively connected to the defining means and to the storage means.

By defining the conditions based on relationships and then identifying clauses in the natural language text database that satisfy conditions, an answer to a natural language question can be found without the need to rely on domain specific world knowledge. Thus, an advantage of the system of the invention is that the amount of data that needs to be stored is decreased and that it is possible to use the system within any domain. Moreover, the precision of the system is high.

BRIEF DESCRIPTION OF THE DRAWINGS

In the following, the present invention is illustrated by way of example and not limitation with reference to the accompanying drawings, in which:

FIG. 3A–B are illustrations of portions of text that constitute answers to the natural language question of FIG. 2;

FIG. 4 is an illustration of another example of an analyzed natural language question;

FIG. 5A–D are illustrations of portions of text that constitute answers to the natural language question of FIG. 4; and FIG. 6 is a schematic diagram of a system according to an embodiment of the invention.

DETAILED DESCRIPTION OF THE INVENTION

Figure 1:
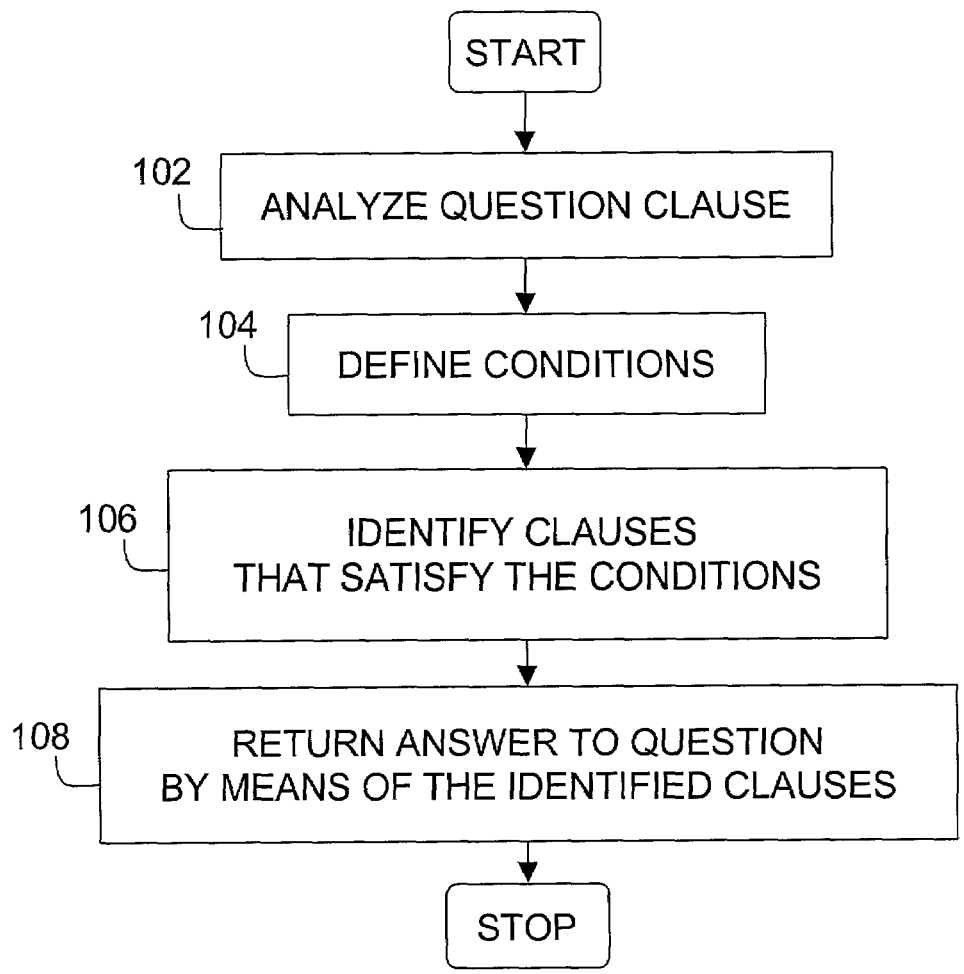
FIG. 1 is a flowchart of a method according to an embodiment of the invention.

In FIG. 1 a flow chart of an embodiment of the invention is shown. In the method one or more answers to a natural language question are found in a natural language text database. One example of a natural language text database is a subset of the text information found in web servers connected to the Internet. The natural language text database has been analyzed in an antecedent process thereby enabling the use of linguistic properties of the text database in order to find answers to a natural language question. The analysis comprises the determination of a morpho-syntactic description for each word token of the natural language text database, a classification of the broad semantic class for each word token, the location of phrases in the natural language text database, the determination of a phrase type for each of the phrases, and the location of clauses in the natural language text database. The morpho-syntactic description comprises a part-of-speech and an inflectional form, and the phrase types comprise different types according to the syntactic functions of the phrases and the part of speech of their heads. The syntactic functions comprise subject, object, main verb, adverbs etc. A clause can be defined as a unit of information that roughly corresponds to a simple proposition, or fact.

Furthermore, the natural language text database has also been indexed and stored. The spaces between each word token are numbered consecutively, whereby the location of each word token is uniquely defined by the numbers of the two spaces it is located between in the natural language text database. The interval defined by these two numbers form a unique word token location identifier. Alternative schemes for locating word tokens are known by persons skilled in the art, and the choice of which scheme to use is not critical to the invention. Since each word token is associated with a word type, it is sufficient to store all of the word types of the natural language text database and then, for each of the stored word types, store the word token location identifier of each word token associated with this word type. Furthermore, the location of a phrase is uniquely defined by the number of the space preceding the first word token of the phrase and the number of the space succeeding the last word token of the phrase. These two numbers form a phrase location identifier. Thus, each phrase type is stored and the phrase location identifier of each of the phrases of this phrase type is stored. Note that, due to the way the phrase location identifier is defined, it is easy to find out whether a word token occurs in a phrase of a certain type by determining whether the word token location identifier is included in a phrase of this type. The location of a clause is uniquely defined by the number of the space preceding the first word token and the number of the space succeeding the last word token of the clause. These two numbers form a clause location identifier. Each of the clause location identifiers is stored. Location identifiers for sentences, paragraphs, and documents are formed in an equivalent manner and each of them is stored.

A natural language question that is to be answered in this embodiment has been classified in a prior process either as a constituent question or a yes/no question. Furthermore, the question clause of the natural language question has been identified in a prior process as well. The question clause is the clause of the natural language question that conveys the content of the information need. In a direct question, the question clause is the main clause, and in an indirect question the question clause is a subordinate clause.

In step 102 a question clause is analyzed in the same way that the natural language text database has been analyzed, i.e. the syntactic function of its constituents and the lexical meaning of its word tokens are determined. Based on this analysis, a set of conditions for a clause in the natural language text database to constitute an answer to the question clause are defined in step 104. The conditions are that at least one of the constituents in the question clause should have corresponding constituents in the clause, i.e. constituents that each has the same syntactic function and an equivalent lexical meaning as the corresponding constituent in the question clause.

When the conditions have been defined, clauses that satisfy the conditions are identified in the natural language text database in step 106 of FIG. 1. In the identification, the word type of the natural language text database that correspond to a word token in the question clause, and that have a lexical meaning equivalent to the word tokens in the question clause, are identified. Then the word token location identifiers associated with the identified word types are identified in the index. The identified word token location identifiers are then used to identify the word tokens in the natural language text database that are included in a phrase of the same type as the word token in the question clause is included in, i.e. a phrase that has the same syntactic function. This is done by searching the phrase location identifiers associated with the phrase type that the word token in the question clause is included in, and determining which of the identified word token location identifiers are included in one of these phrase location identifiers. This comparison is done for each of a subset of the word tokens in the question clause, and in addition to determining if the word token is included in the same phrase type, it is determined whether the word tokens are included in the same clause. This can be done easily by determining whether the word token location identifiers are included in the same clause location identifier.

When all the clauses that satisfy the set of conditions have been identified in step 106, portions of text that each comprises one of the clauses that satisfy the set of conditions are extracted in step 108 of FIG. 1. These portions of text may then be presented to a user as an answer to the natural language question, or be further processed.

In the following two examples of analyzed natural language questions will be given with reference to FIG. 2–5. In the examples a number of abbreviations will be used which are explained in the table below:

| Abbreviation | Description |
| --- | --- |
| AT | Article |
| NNS | Plural noun |
| NP | Proper noun |
| VB | Verb, base form |
| VBG | Verb present participle, gerund |
| VBD | Verb, past tense |
| WPS | Wh-pronoun, subject |
| WPO | Wh-pronoun, object |
| nps | Subject noun phrase |
| npo | Object noun phrase |
| vp | Verb phrase |
| cl | Clause |
| s | Sentence |

Figure 2:
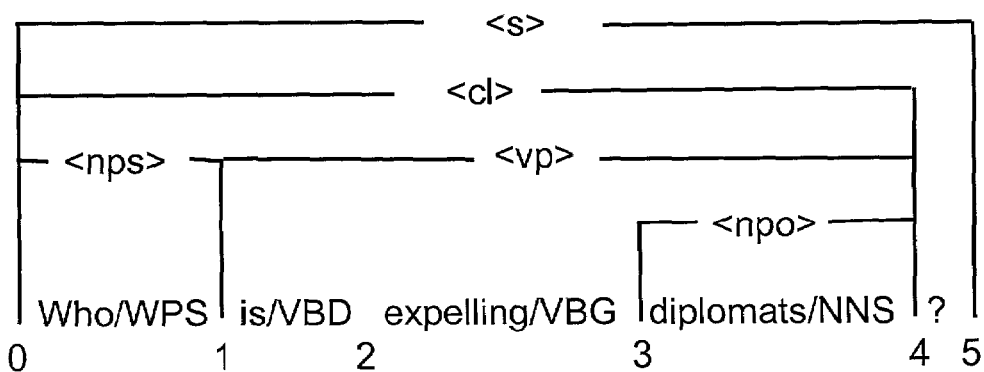
FIG. 2 is an illustration of an example of an analyzed natural language question.

FIG. 2 illustrates an example of an analyzed natural language question. The question is: Who is expelling diplomats?. The question only includes one clause and the clause also constitutes a sentence. The question clause of the question is the entire question. The question clause has been analyzed with respect to a morpho-syntactic description for each word token, a lexical description (not shown) comprising lemma, a broad semantic class for each word token and synoyms, the location of phrases, a phrase type for each of the phrases, and the location of clauses. Thus, for each word token, the morpho-syntactic code is indicated, and for each space between the word tokens the number of the space is indicated. Furthermore, the location of phrases and their respective type is also indicated. Based on this analysis a set of conditions is defined for a clause in an analyzed natural language text database to constitute an answer. The natural language text database has been analyzed with respect to a morpho-syntactic description for each word token, lemma and a broad semantic class and a synonym set for each word token, the location of phrases, a phrase type for each of the phrases, the location of clauses, and the location of sentences. In this case who is the subject noun phrase, expelling is the main verb, and diplomats is the object noun phrase of the question clause. This will give the conditions that there should be a subject noun phrase in the clause, the lemma of the main verb in the clause should be expel, and the lemma of the head of the object noun phrase of the clause should be diplomat, respectively, in order for the clause to constitute an answer to the question. In addition to the condition that there should be a subject noun phrase, the result of the analysis of the question clause indicates that the subject noun phrase is the queried constituent. Furthermore, the interrogative pronoun who indicates that this subject noun phrase should denote a person. Note that the conditions may be relaxed so that they are satisfied not only for word tokens with the same lemma, but also for word tokens that are synonyms. For example the lemma of the main verb would be allowed to be deport in addition to expel.

Turning now to FIG. 3A–B, portions of text that constitute answers to the natural language question of FIG. 2 are illustrated. The answers have been extracted from the analyzed natural language text database. In FIG. 3A a sentence is illustrated that includes an answer clause. In this case the first clause of the sentence has the main verb expelling, the object noun phrase Russian diplomats and the subject noun phrase the US. Thus, the clause satisfies the conditions above. In this case the entire sentence that the clause is included in is extracted and presented as an answer. In FIG. 3B a sentence is illustrated including only one clause. The clause has the main verb expelling, the object noun phrase a matching number of US diplomats and the subject noun phrase Russia. Thus, the clause satisfies the conditions above, and the clause is extracted and presented as an answer.

FIG. 4 illustrates an example of an analyzed natural language question. The question is: What did the ECB do?. As in the question depicted in FIG. 2 the question clause of the question is the entire question. The question clause has been analyzed with respect to a morpho-syntactic description for each word token, lemma and a broad semantic class for each word token (not shown), the location of phrases, a phrase type for each of the phrases, and the location of clauses. Thus for each word token the morpho-syntactic code is indicated, and for each space between the word tokens the number of the space is indicated. Furthermore, the location of phrases and their respective type is also indicated. Based on this analysis a set of conditions for a clause in an analyzed natural language text database to constitute an answer is defined.

The natural language text database has been analyzed with respect to a morpho-syntactic description for each word token, a broad semantic class for each word token, the location of phrases, a phrase type for each of the phrases, the location of clauses, and the location of sentences. In this case the ECB is the subject noun phrase, and do is the main verb of the question clause. The fact that the ECB is the subject noun phrase will give the condition that the head of the subject noun phrase in a clause should be the ECB in order for the clause to constitute an answer to the question. In addition to this, the interrogative pronoun what together with the main verb do, i.e. do_what, indicates that the queried constituent is an active verb phrase. Thus, a further condition is that a clause should include an active verb phrase in order for the clause to constitute an answer to the question.

Turning now to FIG. 5A–D, portions of text that constitute answers to the natural language question of FIG. 4 are illustrated. In FIG. 5A, a sentence including clause boundaries within the sentence illustrates one answer to the question in FIG. 4. In this case the first clause of the sentence has the subject noun phrase the ECB and an active verb phrase has made mistakes. Thus, the clause satisfies the conditions described with reference to FIG. 4. In this case the entire sentence that the clause is included in is extracted and presented as an answer. In FIG. 5B, a sentence including clause boundaries within the sentence illustrates a second answer to the same question. In this case the second clause of the sentence has the subject noun phrase the ECB and an active verb phrase imposed. Thus, the clause satisfies the conditions described with reference to FIG. 4. In FIG. 5C, a sentence including clause boundaries within the sentence illustrates a third answer to the same question. In this case the first clause of the sentence has the subject noun phrase the ECB and an active verb phrase has never pursued a pure policy of minimising the rate of inflation. Thus, the clause satisfies the conditions above. Furthermore, the second clause also comprises an active verb phrase has taken a much more practical approach of maximising the rate of growth, but it does not include a subject noun phrase including the ECB and thus it does not satisfy the conditions. However, in this case the entire sentence that the first clause is included in has been extracted and presented as an answer. Thus, the relation between the active verb phrase in the second clause and the ECB in the first clause will be apparent to a user. In FIG. 5D, a sentence including only one clause illustrates a fourth answer to the same question. The clause has the subject noun phrase the ECB and an active verb phrase has performed almost spectacular well. Thus, the clause satisfies the conditions above, and the clause is extracted and presented as an answer.

Turning now to FIG. 6, a schematic diagram of a system according to an embodiment of the invention is shown. The system comprises analyzing means 602 for analyzing a computer readable representation of a clause, storage means 604 for storing an analyzed natural language text database, a question manager 606, defining means 610 for defining conditions for a clause to constitute an answer to a question clause, answer finding means 612 for finding clauses in a text database that constitutes answers to a question clause, and result managing means 620. The text analyzing unit 602 is arranged to analyze a natural language text input, such as a natural language question or a natural language text database. The analysis includes the determination of a morpho-syntactic description for each word token of the natural language input, a classification of the broad semantic class for each word token, the location of phrases in the natural language input, the determination of a phrase type for each of the phrases, and the location of clauses in the natural language input. The morpho-syntactic description comprises a part-of-speech and an inflectional form, the lexical description of a word type comprises lemma, semantic class, and synonyms, and the phrase types comprises different types denoting the syntactic functions of the phrases, such as subject noun phrase, object noun phrase, other noun phrases and prepositional phrases.

In FIG. 6, the memory means 604, operatively connected to the text analysis unit 602, are arranged to store a natural language text database that has been analyzed by the text analysis unit 602. The natural language text database is stored in an index in the storage means 604. The indexing is based on a numbering scheme where the spaces between each word token are numbered consecutively. An alternative numbering scheme where each word token is consecutively number is also within the scope of the invention. Each word token is then defined by its word type and the numbers of the two spaces it is located between in the natural language text database. The two numbers of the spaces between which a word token is located form a word token location identifier for this word token. Furthermore, a phrase is uniquely defined by its phrase type and the number of the space preceding the first word token of the phrase and the number of the space succeeding the last word token of the phrase. The number of the space preceding the first word token of a phrase and the number of the space succeeding the last word token of the phrase form a phrase location identifier for this phrase. Similarly, a clause, a sentence, a paragraph and a document location identifier, respectively, is defined as the number of the space preceding the its first word token and the number of the space succeeding its last word token. The word types, word token location identifiers, phrase types, phrase location identifiers, clause location identifiers, paragraph location identifiers, sentence location identifiers and document location identifiers are stored in the index that is operatively connected to the indexer. The logical and hierarchical structure of the index is shown in the table below:

| Text Unit | Location Identifiers $<i, j>$ |
| --- | --- |
| word type 1 | Word token location identifiers |
| word type 2 | Word token location identifiers |
| ... | |

-continued

| Text Unit | Location Identifiers <i, j> |
|---|---|
| word type n | Word token location identifiers |
| nps | Subject noun phrase location identifiers |
| npo | Object noun phrase location identifiers |
| npx | Predicate noun phrase location identifiers |
| pp | Preposition phrase location identifiers |
| cl | Clause location identifiers |
| s | Sentence location identifiers |
| p | Paragraph location identifiers |
| doc | Document location identifiers |

Furthermore, the question manager 606 in FIG. 6 is operatively connected to the text analysis unit 602 and comprises defining means 610 for defining conditions for a clause in the natural language text database to constitute an answer to a question clause that has been analyzed in the text analysis unit 602. The conditions are that a subset of the constituents in the question clause, should have corresponding constituents in the clause, i.e. constituents that each has the same syntactic function and an equivalent lexical meaning as the corresponding constituent in the question clause. Furthermore, the question manager 806 comprises answer finding means 812 for finding clauses in the natural language text database that constitutes answers to the question clause. The answer finding means 612 use the structure of the index in order to do identify clauses that satisfy the condition defined by the defining means 610. By determining the word type of a word token in a question clause, the corresponding word type in the index, and other word types in the index that have an equivalent lexical meaning give the word token location identifiers since these are stored in the index. Furthermore, since the phrase type that the word token of the question clause is included in, and the phrase type that the word tokens of the natural language text database are included in has been determined in the text analysis unit, it can be determined which of the identified word token location identifiers are included in a phrase of the same type as the word token in the surface variant, i.e. that has the same syntactic function. This is done by searching the phrase location identifiers associated with the phrase type that the word token in the question clause is included in, and by determining which of the identified word token location identifiers are included in one of these phrase location identifiers. This comparison is done for a subset of the word tokens in the question, and in addition to determining whether the word token is included in the same phrase type, the index is also used to determine whether the word tokens are included in the same clause.

Finally, in FIG. 6, the system comprises a result manager 612, operatively connected to the storage means 604, for extracting each portion of text comprising a clause that satisfied the conditions that are defined by the defining means. The portion of text to be extracted can be chosen as the clause satisfying the conditions, the sentence that the clause is included in, or the paragraph that the clause is included in, or the document that the clause is included in. The extraction means use the index to find the desired units (clause, sentence, paragraph or document) by consulting the respective location identifiers in the index.

The invention claimed is:

1. A method of automatically finding one or more answers to a natural language question in a computer stored natural language text database, wherein said natural language text database has been analyzed with respect to clause boundaries, constituents, syntactic functions of the constituents, word tokens of the constituents, and lemmas of the word tokens, and wherein said natural language question comprises a question clause having an interrogative pronoun, comprising the steps of:

analyzing a computer readable representation of said question clause with respect to constituents, syntactic functions of the constituents, word tokens of the constituents, and lemmas of the word tokens;

identifying the interrogative pronoun in said computer readable representation of said question clause;

determining a syntactic function of interest based on the analyzing step and the identified interrogative pronoun;

identifying a constituent having the determined syntactic function in the question clause;

selecting a word token being a lexical head of the identified constituent in the question clause;

defining a set of conditions comprising a condition stipulating that, for a clause in said natural language text database to constitute an answer to said question clause, the clause comprises a word token having the same lemma as the selected word token of the question clause and being comprised in a constituent having the same syntactic function as the identified constituent of said question clause;

identifying clauses in said natural language text database that satisfy said conditions; and returning answers to said question clause by means of the identified clauses that satisfy said conditions.

2. The method of claim 1, further comprising the step of:
determining a syntactic function of a queried constituent based on the analyzing step and the identified interrogative pronoun, wherein said set of conditions comprises a further condition stipulating that, for a clause in said natural language text database to constitute an answer to said question clause, the clause comprises a constituent having the same syntactic function as the queried constituent.

3. The method according to claim 1, wherein the identified constituent of the question clause has the syntactic function main verb, the selected word token is a lexical head of the constituent having the syntactic function main verb of the question clause, and said set of conditions in the defining step comprises:

a verb condition stipulating that, for a clause to constitute an answer to said question clause, the clause comprises a word token being a lexical head of a constituent having the syntactic function main verb, and having the same lemma as the lexical head of the constituent having the syntactic function of main verb of said question clause.

4. The method according to claim 1, wherein the identified constituent of the question clause has the syntactic function subject, the selected word token is a lexical head of the constituent having the syntactic function subject of the question clause, and said set of conditions in the defining step comprises:

a subject condition stipulating that, for a clause to constitute an answer to said question clause, the clause comprises a word token being a lexical head of a constituent having the syntactic function subject, and having the same lemma as the lexical head of the constituent having the syntactic function of subject of said question clause.

5. The method according to claim 1, wherein the identified constituent of the question clause has the syntactic function object, the selected word token is a lexical head of the constituent having the syntactic function object of the question clause, and said set of conditions in the defining step comprises:

an object condition stipulating that, for a clause to constitute an answer to said question clause, the clause comprises a word token being a lexical head of a constituent having the syntactic function object, and having the same lemma as the lexical head of the constituent having the syntactic function of object of said question clause.

* * * * *